United States Patent [19]

Knoll

[11] Patent Number: 4,859,267
[45] Date of Patent: Aug. 22, 1989

[54] METHOD FOR CONSOLIDATING COMPOSITE MATERIALS

[75] Inventor: Frederick L. Knoll, Kent, Wash.

[73] Assignee: The Boeing Company, Seattle, Wash.

[21] Appl. No.: 101,851

[22] Filed: Sep. 28, 1987

Related U.S. Application Data

[62] Division of Ser. No. 813,645, Dec. 26, 1985, Pat. No. 4,715,923.

[51] Int. Cl.⁴ .............................................. B32B 31/20
[52] U.S. Cl. ................................ 156/273.7; 156/282; 156/285; 156/311
[58] Field of Search ............... 156/353, 525, 361, 584, 156/524, 285, 297, 299, 379.6, 382, 499, 583.1, 583.3, 311, 272.2, 354, 272.4, 273.7, 282, 580, 381, 380.9, 379.8; 219/243; 269/22; 100/93 P, 211

[56] References Cited

U.S. PATENT DOCUMENTS

| | | |
|---|---|---|
| 2,519,661 | 8/1950 | Johnson . |
| 3,383,265 | 5/1968 | Garabedian . |
| 3,472,721 | 10/1969 | Abramson et al. . |
| 3,513,934 | 5/1970 | Crowley . |
| 3,513,936 | 5/1970 | Crowley et al. . |
| 3,547,742 | 12/1970 | Cottrell . |
| 3,618,694 | 11/1971 | Crowley . |
| 3,871,941 | 3/1975 | Wasko . |
| 3,872,695 | 3/1975 | Busek . |
| 3,950,038 | 4/1976 | Wood . |
| 3,964,958 | 6/1976 | Johnson . |
| 4,292,108 | 9/1981 | Weiss et al. . |
| 4,311,550 | 1/1982 | Kerttula . |
| 4,326,910 | 4/1982 | Davis . |
| 4,331,500 | 5/1982 | Gersbeck et al. . |
| 4,336,096 | 6/1982 | Dedekind . |
| 4,350,545 | 9/1982 | Garabedian ............................. 156/87 |
| 4,382,836 | 5/1983 | Frank . |
| 4,402,778 | 9/1983 | Goldsworthy . |
| 4,404,057 | 9/1983 | Morrison et al. . |
| 4,419,170 | 12/1983 | Blad . |
| 4,420,357 | 12/1983 | Neubauer et al. . |
| 4,420,359 | 12/1983 | Goldsworthy . |
| 4,447,201 | 5/1984 | Knudsen . |
| 4,541,891 | 9/1985 | Leatherman ......................... 156/382 |

OTHER PUBLICATIONS

Griffiths, G. R. et al., "Manufacturing Techniques for Thermoplastic Matrix Composites," SAMPE Journal, Sep./Oct. 1984, pp. 32-35.

Primary Examiner—Merrell C. Cashion, Jr.
Attorney, Agent, or Firm—Christensen, O'Connor, Johnson & Kindness

[57] ABSTRACT

Fiber-reinforced resin composites or other materials are consolidated in a noncontact-frictionless manner through the use of a pressurized plenum chamber (20) of a fluid bearing (10). The fluid bearing (10) is flexible and floats relative to the material (16) to be consolidated so that ply drop-offs and other variations in the thickness or surface contour of the material are easily accommodated. While within the plenum chamber, the material is locally heated by radiant energy from a source (30) positioned within the chamber. This localized heating enables the material to solidify in cooler zones of the plenum chamber under a uniform pressure.

18 Claims, 4 Drawing Sheets

METHOD FOR CONSOLIDATING COMPOSITE MATERIALS

This is a divisional of the prior application Ser. No. 813,645, filed Dec. 26, 1985, now U.S. Pat. No. 4,715,923, the benefit of the filing date of which is hereby claimed under 35 USC 120.

BACKGROUND OF THE INVENTION

The invention relates generally to the fabrication of structures from fiber-reinforced composite materials and, more particularly, to methods and apparatuses that utilize a fluid bearing to consolidate or lay such materials.

In recent years the use of fiber-reinforced resin composites has increased considerably, particularly in aerospace sturctures where high strength-to-weight characteristics are extremely desirable. Various methods have been devised to form laminated structures using composite materials in the form of sheets or tapes of woven or aligned fibers in a resin matrix. In those methods that use sheet goods as the working material, the laminated structures are formed by stacking or laying up a plurality of plies, with the ply direction and number of plies determined on the basis of the intended use of the resultant structure. In other processes, composite tapes are laid side by side by hand or by automated tape-laying machines in first one direction and then in another direction to form multiple layers having cross-oriented fibers.

After a layup is formed in one of these manners, it is placed inside an autoclave or a press and subjected to heat and pressure. In the case of thermosetting materials, the heat causes the resin to cure; whereas, in the case of thermoplastic materials, the heat raises the resin above its melt temperature. The structures produced in this manner are inherently costly because of the manual handling of the material and the length of time required for the autoclave to cycle.

As a result of these difficulties, efforts have more recently focused upon developing cost-effective methods to process composites having thermoplastic or thermosetting resins. Thermoplastic materials are particularly desirable since they need only be heated to their melt temperature (and not cured) and can be repeatedly softened and solidified. Because of these characteristics, it is possible to form sheet stock, or preconsolidated multiple-ply laminates, which are subsequently formed or machined into the final product or part. Several proposals have been made to utilize point contact, such as via belts, pressure rollers, or shoes, to provide the pressure needed for consolidation. To supply the necessary heat, suggestions have been made to heat the material just before entering the pressure area or heat the material while in the pressure area via the use of a heated roller or hot shoe. There are a number of disadvantages with these approaches. First, frictional loads are undesirably applied to the material as it moves relative to the rollers, belts, or shoes. Secondly, it is difficult to precisely control the speed of the material through the pressure area in relation to the melting cycle so that the material properly solidifies under a uniform pressure before leaving the pressure area. Thirdly, with ultimate contact between the machine and material, problems of buildup and release can occur.

A fourth, and important, disadvantage is that these methods are limited to the formation of continous sheets or other parts having a substantially constant thickness. Many parts, particularly those used in aerospace applications, do not have a constant cross-sectional configuration or uniform thickness. For example, a wing skin generally tapers in thickness in a spanwise direction from the root to the tip. When composite materials are used to form such tapering parts, the necessary taper is produced by gradually dropping off, or reducing, the number of plies. The step-like "ply drop-offs" that occur where a ply is discontinued produce an irregular contour and an incremental change in thickness. The foregoing arrangements rely upon a fixed gap in the pressure area and thus cannot accommodate the ply drop-offs or follow the irregular contour.

SUMMARY OF THE INVENTION

In accordance with the invention, methods and apparatus for consolidating composite materials and for laying tape are provided. The inventive techniques are based upon the use of a pressurized plenum chamber of a fluid bearing to provide the requisite pressure for consolidating or laying the composite material. A thin supporting cushion of pressurized fluid holds the fluid bearing out of physical contact with the material to be consolidated, so that pressure can be applied in a frictionless manner as the bearing and material are moved relative to one another. Since the fluid bearing is flexible and floats relative to the material to be consolidated, ply drop-offs and other surface irregularities are easily accommodated.

In accordance with an additional aspect of the invention, the material may be heated while the pressure in the plenum chamber is being applied. In a preferred embodiment, the heating is accomplished by focusing radiant energy onto the material. Since the material itself is caused to be heated with radiation, the surrounding atmosphere in the plenum chamber remains relatively cool. Thus, as the material moves beyond the area of focused energy into the cooler areas of the plenum chamber, it is able to solidify while still under a uniform pressure. Consequently, laminates produced in this manner are less likely to include voids or other faults, which cause delamination.

According to one method of this invention, plies of the composite material to be consolidated are stacked on a working surface. A fluid bearing is inflated and the plenum chamber thereof pressurized with fluid. A load is applied to the fluid bearing to develop a predetermined pressure in the plenum chamber. The chamber is then positioned in superposed relation to the plies and the work surface so that the pressure in the plenum chamber is applied to the plies. It will be appreciated that this method is well suited for debulking, or pressing together, multiple plies of composite material preparatory to subsequent processing steps.

An apparatus for consolidating materials according to the invention includes a fluid bearing having a flexible inflatable cushion that forms a plenum chamber when inflated. Means are included for inflating the cushion and pressurizing the plenum chamber with fluid to cause the fluid bearing to float in proximate relationship to a work surface and the material thereon to be consolidated. The apparatus further includes means for applying a load to the fluid bearing so that the requisite pressure needed to consolidate the material is developed in the plenum chamber. The apparatus also includes means for positioning the fluid bearing so that the plenum chamber is superposed relative to the material and the work surface to apply the pressure in the plenum chamber to the material. Finally, heating means are included for heating the material while the pressure present in the plenum chamber is applied thereto. In accordance with further aspects of the invention, the positioning means may include drive means for providing relative motion between the fluid bearing and the material so that the material moves relative to the plenum chamber.

As will be readily appreciated, the invention provides an arrangement that overcomes the above-described problems associated with prior methods of consolidating composite materials. More specifically, the invention enables the application of both heat and pressure to a composite material without physically contacting that material. Moreover, the freedom of movement resulting from the floating nature of the fluid bearing and the flexibility of the bearing itself combine to enable the consolidation of staggered ply thicknesses and irregularly contoured surfaces. Moreover, the use of focused radiant heating within the plenum chamber enables the material to be cooled while still subjected to the pressure within the plenum.

BRIEF DESCRIPTION OF THE DRAWINGS

The foregoing aspects of the invention and many of its attendant advantages can be more readily understood by the following portion of the specification taken in conjunction with the accompanying drawings in which:

FIG. 8 schematically illustrates still another form of consolidation machine that employs a static weight.

DETAILED DESCRIPTION OF THE PREFERRED EMBODIMENT

In the past, a variety of fluid bearings or casters have been developed to establish and maintain a thin film of pressurized fluid, such as air, between a load and an operating surface over which the load is to be moved. Since the thin fluid film lifts the load from the surface and provides a frictionless bearing, the load may be easily moved in any direction with minimal force. Such fluid bearings are frequently used to move heavy load-bearing pallets over a factory floor.

A fluid bearing that is frequently used in load-supporting application has an inflatable, flexible cushion in the shape of a torus. The flexible cushion is mounted in sealed engagement with the bottom surface of a load-carrying platform so that the central opening of the torus defines, in conjunction with the bottom surface and with an adjacent operating surface, a pressurizable plenum chamber. Fluid under pressure is introduced into the bearing, initially inflating the cushion through a series of openings provided in the upper surface thereof. As the cushion becomes more inflated and assumes a more rounded configuration, the pressurized fluid also enters the plenum chamber. When the force of the pressure within the plenum chamber exceeds the total load on the bearing, the entire bearing is lifted from the surface on a thin fluid film. As long as fluid under pressure is continuously supplied, the fluid film bearing is maintained, allowing frictionless motion between the device and the opposing surface.

The present invention utilizes both the friction-free characteristics of a fluid bearing and the availability of a uniform pressure within the plenum chamber to consolidate composite materials in a unique manner that completely eliminates physical contact between parts of the machine and the material being consolidated. This can be better understood with reference to FIG. 1, which, in simplified pictorial form, illustrates the flexible cushion 10 of a fluid bearing in its inflated condition in superposed relation to a working surface 12 of a tool 14 and material 16 thereon to be consolidated.

The flexible cushion 10 is in the shape of a torus and has a central opening or cavity. The cushion 10 is mounted on the underside of a support platform, which is not shown in FIG. 1 but is described below with reference to FIGS. 2 and 3. The cavity of the flexible cushion 10 defines, in conjunction with the bottom surface of the platform and the opposing working surface 12, a pressurizeable plenum chamber 20. Pressurized fluid introduced through a fluid inlet 18 divides to inflate the cushion 10, via apertures 22, and to pressurize the plenum chamber 20 of the bearing. When the bearing reaches its steady operating state, a uniform pressure is applied over the circular area bounded by an imaginary seal line 24 that passes through the bearing area of the fluid film. To develop a predetermined, desired amount of pressure within the plenum chamber, a load indicated by the arrows 26 is applied to the fluid bearing in a manner that will be described in greater detail hereinafter. As the load is increased, the pressure within the plenum chamber 20 increases by a corresponding amount so as to apply resistive forces that maintain the bearing in its floating condition. Thus, by varying the load applied to the bearing, the pressure applied to the material can be easily controlled.

In accordance with an important aspect of the invention, the load is applied in such a manner that the fluid cushion 10 retains its ability to float relative to the material 16, i.e., toward and away from the material and the work surface. For example, for the planar working surface 12 suggested by FIG. 1, the flexible cushion moves along an axis that is normal to the working surface. This freedom of movement advantageously enables the accommodation of different materials having different thicknesses for separate operations and, during a given operation, materials that have a changing thickness, such as, for example, multilayer composite materials having a plurality of "ply drop-offs," "pad-ups," or other irregular surfaces. The flexibility of the cushion 10 also contributes to the ability of the apparatus to accommodate variations in the contour or cross-sectional thickness of the materials being consolidated. As will be explained in more detail hereinafter, it is contemplated that machines constructed in accordance with the invention may include means for providing relative movement between the flexible cushion 10 and the tool 14 so that there is relative movement between the material 16 and the pressurized plenum chamber 20. With such an arrangement, the portion of the flexible cushion that first encounters a changing cross section will deform slightly because of its flexibility. Thereafter, as the plenum chamber becomes positioned over the changing contour, the entire fluid bearing will move either toward or away from the material to "climb over" the changing contour.

The foregoing arrangement of components can be used to configure apparatuses for a number of applications. While uses involving fiber resin composite materials are of particular interest, the invention is not so limited. In general, the inventive method and apparatus can be used wherever it is desired to press one or more layers of material against a work surface or to unite or press together several separate layers to form a compact mass. The term "consolidate" is used herein to broadly describe these various manners of pressing, pressing together, or uniting materials. A nonexclusive list of applications include consolidating, de-bulking, or curing cross-ply or multi-ply laminates, and laying composite tapes. The nature of the end result, i.e., the resultant consolidated product will depend upon the materials used and the process conditions, i.e., the pressure applied, the heat, if any, applied, and the respective quantities thereof.

For pressing together materials that do not require heating or for some composite tape-laying applications, the techniques described so far can be used to form consolidating machines or tape-laying heads. It will be readily appreciated that various sizes, shapes, and configurations can be provided for the flexible cushion 10 and the work surface with which it cooperates. For example, in tape-laying applications, the fluid bearing and torus can be dimensioned complementary to the dimensions of available composite tapes and used in conjunction with conventional components of such apparatus, such as a gantry, tape supply, backing take-up rollers, and associated heating devices, if necessary, to impart tackiness to the resinous matrix. Cushions having large diameters can be used in conjunction with flat work surfaces to form continuous sheets of material, while cushions having a curved, lower surface contour can be used in conjunction with tools having curved work surfaces to form parts with curvature, such as wings and other aerospace structures having airfoil surfaces.

Figure 1:
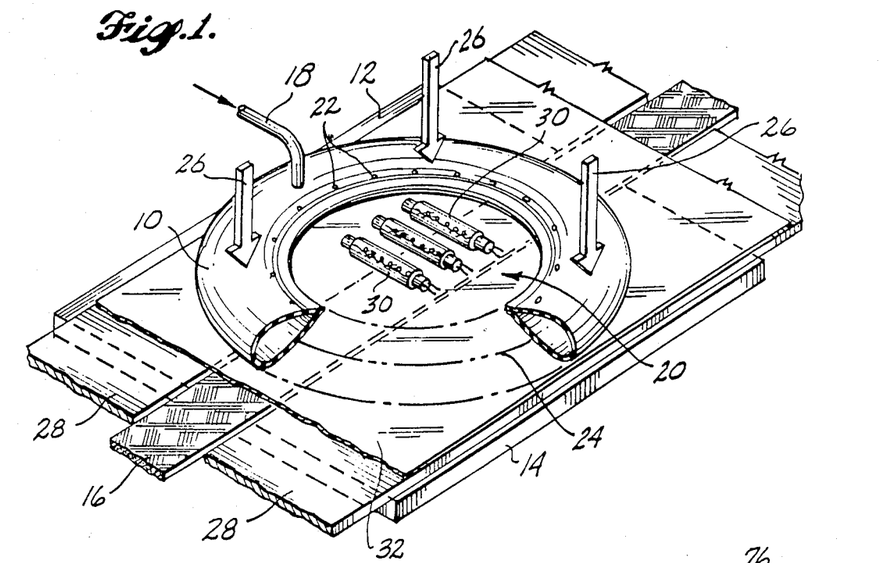
FIG. 1 is a pictorial diagram illustrating one form of apparatus for consolidating composite materials in accordance with the invention.

In forming most composite laminates, it is necessary to heat the material to tackify or cure the resin in the case of thermosets or to melt the resin in the case of thermoplastics. In accordance with an additional aspect of the invention, means are included for applying heat to the material while it is under pressure. When working with composite materials, it has been found particularly advantageous to use radiant heating means to irradiate the material with radiant energy. In FIG. 1, this is schematically illustrated by the three lamps 30, which are shown suspended in the upper central portion of the plenum chamber 20. Quartz or tungsten halogen photoflood lamps have been used quite successfully in consolidating thermoplastic materials with a prototype machine constructed in accordance with the invention. A preferred alternative is to use infrared lamps to avoid unnecessarily heating the fluid within the plenum chamber. It is also preferable to provide means for focusing the radiation so that there is only localized heating of the material, e.g., heating only a central zone or area within the plenum chamber. Mounting the lamps within a reflective chamber is one suitable arrangement. It will be recognized that other sources of radiant energy (such as lasers) or other means of localized heating can be employed. The selection of a different source of radiant energy may require use of a different focusing means. For example, with a laser source a lens arrangement may be desirable.

In recent years, inductive bonding heads that can heat composite materials with fluctuating magnetic fields have been developed and produced on a limited scale. These devices have produced satisfactory results in consolidating composites but, however, because of their low power are capable of doing so only in relatively narrow strips. As this technology matures, it is believed that improved inductive bonding heads will be developed that can be used with excellent results in conjunction with the invention, particularly because of the "pure" localized nature of the heating that they produce.

The advantage of using radiant or other localized heating with the present invention is that it avoids the unnecessary and undesirable heating of the surrounding fluid within the plenum chamber and, as well, avoids heating of the inflatable cushion 10. Several favorable results follow from these advantages. First, since cooler temperatures exist in the outer portions of the plenum chamber, the material being consolidated is able to cool and solidify within the plenum chamber while under a uniform pressure. In addition, since the use of localized heating avoids heating the cushion, the cushion can be constructed from the flexible materials that are used conventionally to fabricate fluid bearings used for load-carrying purposes. The advantages attendant to the flexibility of the cushion will be recalled from the discussion above.

It is anticipated that the invention will find considerable use in consolidating multi-ply laminates such as stacks of individual plies having unidirectional or woven fibers. Where a large number of plies are to be consolidated, it may be necessary to position shims 28 adjacent the stack of plies (material 16 in FIG. 1) to provide a reasonably level surface for the inflatable cushion 10. Since most fiber resin composite materials are porous prior to consolidation, they will not resist fluid pressure. As a consequence, it may be necessary to interpose a nonporous pressure diaphragm 32 between the inflatable cushion 10 and the material 16. This nonporous diaphragm enables pressurization of the plenum chamber and transfer of the pressure therein to the material 16. In those embodiments that utilize a source of radiant energy to heat the material, the pressure diaphragm must be substantially transparent to the wavelength of the emitted radiation. For infrared or other radiant lamps, the pressure diaphragm 32 can be a thin film, such as polyimide "bagging" film of the type now used in conventional autoclave composite processes.

Figure 2:
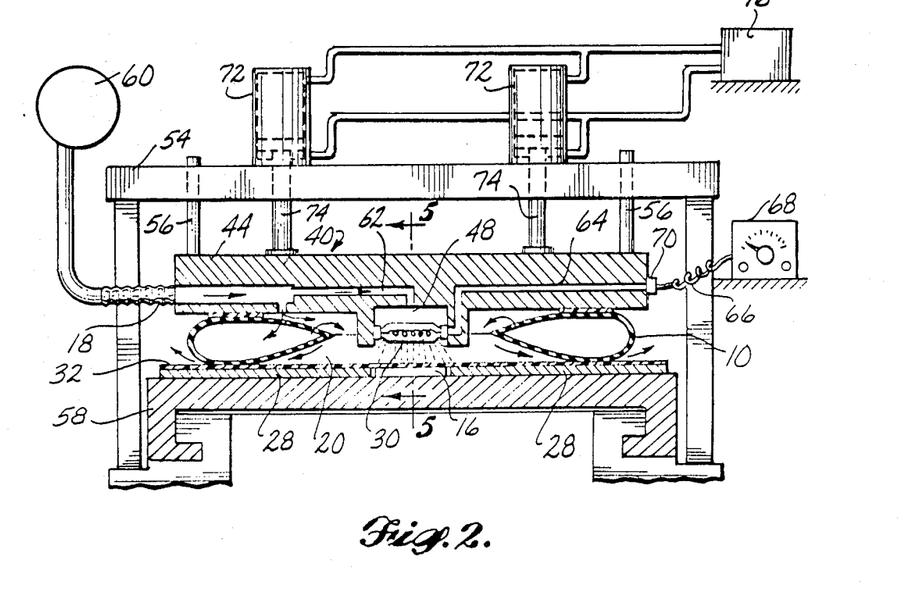
FIG. 2 is a side elevation view in partial section of another form of composite consolidation machine according to the invention.
Figure 3:
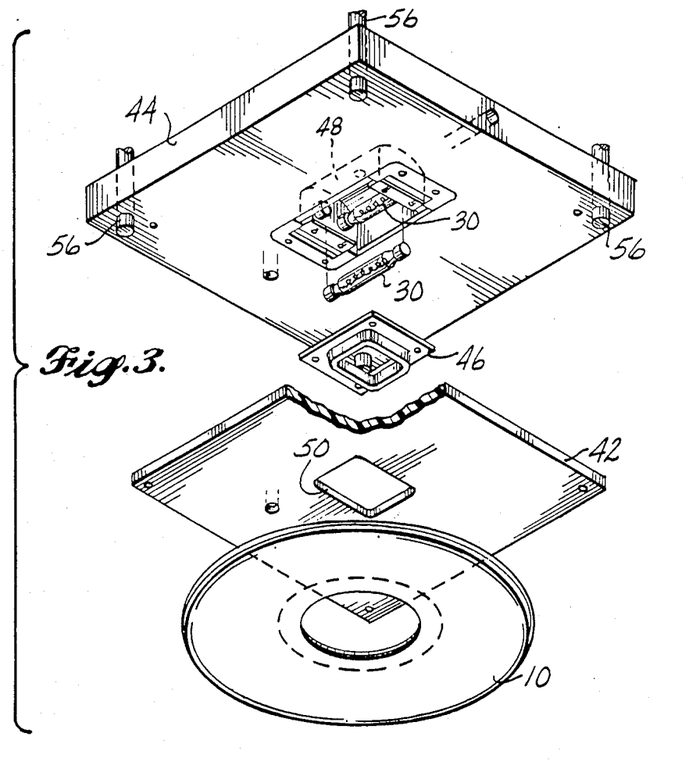
FIG. 3 is an exploded isometric bottom view of the fluid bearing head assembly of the machine of FIG. 2.
Figure 4:
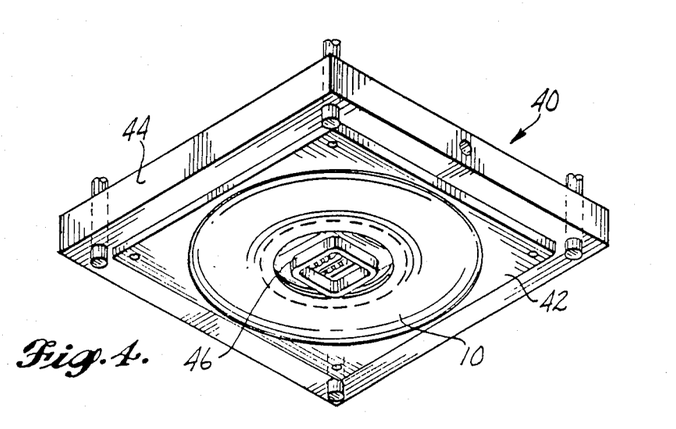
FIG. 4 is an isometric bottom view of the fluid bearing head assembly of FIG. 3.
Figure 5:
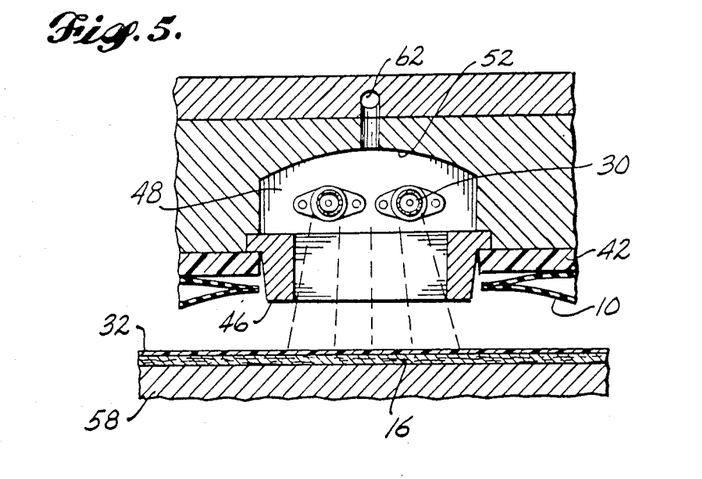
FIG. 5 is a partial sectional view taken along line 5—5 of FIG. 2.

For ease of understanding, like numerals have been utilized to identify those major components in the FIGS. 2 through 5 embodiment that have correspondence in FIG. 1. Referring first to FIGS. 3 and 4, a fluid bearing head assembly includes the inflatable, flexible cushion 10 mounted on the lower surface of a backing plate 42. The backing plate, in turn, is mounted to the underside of a support platform 44. A pair of lamps 30 are mounted within a focusing chamber 48 formed within the support platform 44. The upper surface 52 of the focusing chamber (see FIG. 5) is curved and reflective to direct and focus the radiant energy emitted by the lamps 30. A spacer ring 46 is mounted to the support platform 44 and extends through an opening 50 provided in the center of the backing plate 42. As seen best in FIG. 4, when the flexible cushion is in its deflated condition, the spacer ring 46 protrudes beyond the outermost extent of the cushion to provide a support for the head assembly 40 in the manner of the centrally located landing pads of conventional fluid bearings. With additional reference now to FIG. 2, the fluid bearing head assembly 40 is mounted to a frame 54 by four guide pins 56. The guide pins are rigidly connected to the support platform 44 and slidably received in bushings (not shown) on the supporet platform so that the entire head assembly 40 is free to move upwards and downwards in a vertical direction.

The material 16 to be consolidated is positioned upon the upper surface of a conventional slide table 58. The table and the items disposed thereon move along an axis in the direction of the view of FIG. 2 while the frame, and, hence, the head assembly 40 remain stationary. Pressurized fluid from a source 60 is introduced through the fluid inlet 18 into the hollow interior of the inflatable cushion 10 and into the plenum chamber 20. Where the lamps 30 are of a type that generates significant heat, it is possible that the air within the plenum chamber 20 will be elevated to a temperature such that the material being consolidated will not sufficiently solidify before leaving the plenum area. To prevent this and to increase the longevity of the lamps, it is desirable in such situations to include means for regulating the temperature inside the plenum chamber and means for cooling the lamps and their associated sockets and electrical connections. An effective solution is to divert a portion of the incoming pressurized fluid through an auxiliary channel 62 that opens into the chamber 48 that contains the lamps. Although not shown in FIG. 2, a valve can be included to control the amount of fluid flowing through the auxiliary channel 62 and thus, the degree of cooling. In the working prototype illustrated in FIG. 2, the cooling fluid is allowed to bleed in a controlled manner through a conduit 64 that carries the wiring 66 from an electrical source 68 that energizes the lamps. In this arrangement, fluid flow is metered by a valve (not shown) that connects the electrical conduit 64 to atmosphere at a position adjacent a plug 70, which seals the wiring and the exterior opening of the conduit 64. It is to be appreciated that the cooling of the plenum chamber and the electrical components may be accomplished in a variety of ways. For example, additional auxiliary channels and valves can be included to controllably introduce and exhaust cooling fluid into and out of the plenum chamber and around the electrical components. Where it is anticipated that high temperatures will be developed within the plenum chamber, it is desirable to configure the cooling arrangement so that the heat that is developed within the chamber is not exhausted outwardly under the inflatable cushion 10 but, rather, through an auxiliary channel. Such an arrangement avoids the problem of overheating the inflatable cushion.

It is preferable to also include means for monitoring both the temperature and the pressure within the plenum chamber 20. It will be readily appreciated that various forms of conventional temperature-measuring devices, such as thermocouples, and pressure sensors can be included in the fluid bearing head assembly to accomplish these monitoring functions. It will also be recognized that such sensors can be integrated into a control system or systems that regulate the pressure and temperature within the plenum.

Four hydraulic cylinders 72 (two of which are shown in FIG. 2) are mounted to the frame so that the actuating rods 74 thereof bear against the support platform 44 of the head assembly 40. A controlled amount of pressurized fluid from a source 76 is introduced into the hydraulic cylinders 72 to apply a predetermined load to the head assembly 40 and thereby establish and maintain the desired level of consolidation pressure within the plenum chamber 20. It will be understood that other arrangements can be utilized to apply the load to the fluid bearing. The selection of a particular alternative arrangement will be guided by the preferred criteria that the assembly on which the fluid cushion is mounted be allowed to float relative to the material being consolidated to accommodate materials having various thicknesses, surface irregularities, and the like.

FIG. 8 pictorially illustrates one loading arrangement that is particularly inexpensive to fabricate and operate. A static, or stationary, weight 78 is mounted to a fluid bearing assembly 80 on a side thereof opposite the inflatable cushion 82. A drive system comprising pulleys 84, cable 86, and motor 88 is intended to demonstrate that the use of a static weight as the loading mechanism permits significant simplification of the machinery needed to position, drive, and guide the consolidation machine relative to the material 90 being processed. Since the pressurized fluid cushion upon which the assembly floats is always maintained, there is no need to include complicated machinery to regulate the spacing between the consolidation machine and the table 92 that supports the material 90. In addition, no separate system (such as the hydraulic system of FIG. 2) is needed to establish the desired level of pressure in the plenum chamber. If a variable load capability is required, it can be easily provided through the use of multiple weights that can be added and removed as needed or through the use of a reservoir that can be filled as needed with a liquid to provide the requisite weight.

Figure 6:
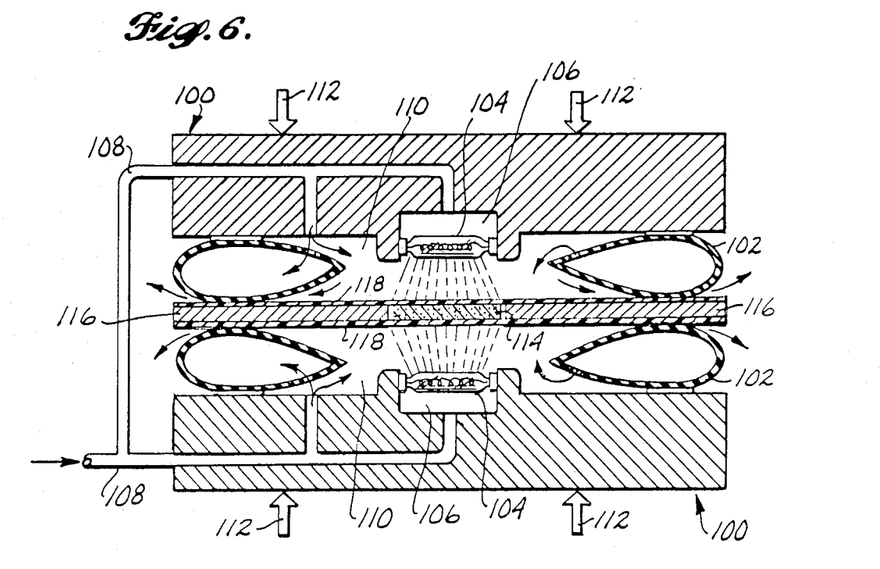
FIG. 6 is a pictorial side elevation view, in section, illustrating a form of a consolidating machine according to the invention that utilizes a pair of opposed fluid bearings.

FIG. 6 illustrates a modified consolidating apparatus that employs a pair of opposed fluid bearing assemblies to apply heat and pressure to opposite sides of the material to be consolidated. Each of the two head assemblies 100 is identical to the fluid bearing head assembly 40 of FIG. 2, having an inflatable, flexible cushion 102 and a lamp 104 mounted within a reflective chamber 106. Pressurized fluid from a source not shown is introduced through each of the inlets 108 to inflate the cushion 102, pressurize the plenum chamber 110 formed by the cushion, and to regulate the temperature within the plenum chamber and cool the lamp. Suitable means (not shown) such as those used in the FIG. 2 embodiment position the head assemblies 100 in opposed relation and apply loads 112 thereto. In constructing a machine according to this embodiment, relative motion between the material being consolidated and the plenum chambers 110 can be effected either by maintaining the head assemblies 100 stationary and passing the material therethrough or by maintaining the material stationary and moving the head assemblies in synchronism thereover. As illustrated in FIG. 6, shims 116 and transparent pressure diaphragms 118 may be used where necessary because of the thickness or porous nature of the material 114.

Figure 7:
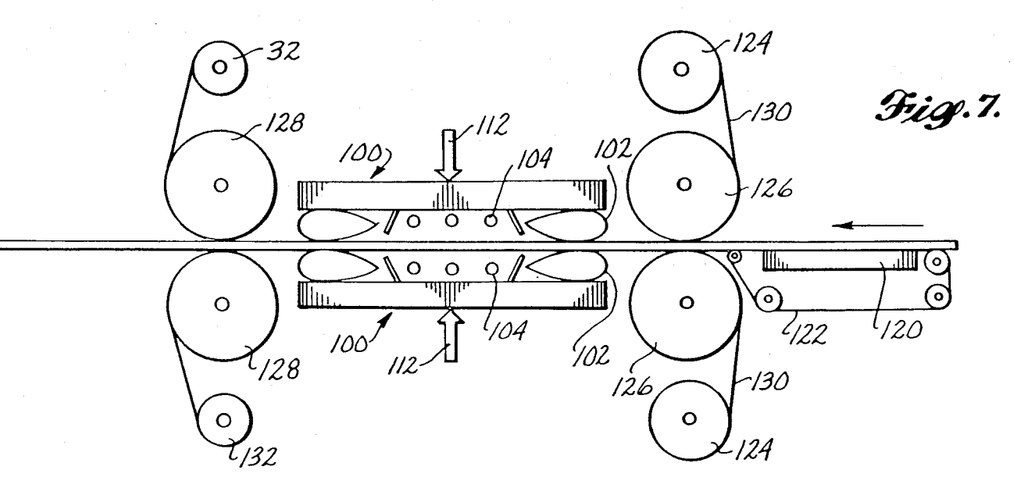
FIG. 7 schematically illustrates an automated version of the consolidation machine of FIG. 6.

FIG. 7 schematically illustrates a continuous process consolidation machine in accordance with the embodiment of FIG. 6. The incoming material, for example, a stack of plies, is supported by a table 120 and continuous belt 122. Since it is assumed that the material is porous, the necessary pressure diaphragm is provided in the form of film that is transparent to the radiant energy emitted by the lamps 104 of the head assemblies 100. For each side of the material, the film is dispensed from a roll 124 and stretched and applied to the material by an expandable slat roll 126. These slat rolls are of the type used in the textile industry that have a plurality of cam-operated boards disposed about a roller. At the outlet end of the machine, the film 130 passes around a drive roll 128 and onto a film takeup roll 132. Further details of the machine, such as the means for applying the loads 112 and the manner of inflating the cushions 102 will be readily understood from the previous discussion.

From the foregoing, it will be appreciated that the invention provides a means for consolidating materials by applying either pressure alone, or pressure in conjunction with heat, without requiring that any machine component come into intimate physical contact with the materials. This minimizes frictional forces being applied to the materials and obviates the problems of resin buildup and release characteristic of prior processing methods. Unlike previous arrangements that cannot adapt to variations in material thickness because of fixed spacing between belts or rollers, the present invention utilizes a fluid bearing head assembly that is free to float up over large laminate thickness changes. The use of a flexible fluid cushion also enables the apparatus to follow or conform to changing thicknesses or surface contours. Finally, the use of focused radiant heating or other localized heating within the pressurized area allows the material to solidify under a uniform pressure and, thus, eliminates the problem of delamination.

While preferred embodiments of the invention have been described, it will be understood by those skilled in the art that various changes can be made therein without departing from the spirit and scope of the invention. For example, the cushion may have other than a torus configuration, and may be varied in size and configuration to provide smaller or larger pressure areas or to conform to curved working surfaces. In addition, while air is a principal choice for the pressurized fluid, it is possible to utilize other fluids, such as an inert gas. These modifications as well as others are intended to fall within the scope of the following claims.

The embodiments of the invention in which an exclusive property or privilege is claimed are defined as follows:

1. A method for consolidating composite materials with a fluid bearing, said fluid bearing having an inflatable cushion that surrounds a cavity, said cavity cooperating with an opposing surface to form a pressurizeable plenum chamber when said inflatable cushion is inflated, said method comprising the steps of:
   stacking at least two plies of composite material on a work surface;
   inflating said fluid bearing and positioning said fluid bearing in opposed relation to said work surface to form said pressurizeable plenum chamber;
   pressurizing said plenum chamber with fluid;
   applying a load to said fluid bearing to develop a pressure in said plenum chamber; and
   positioning said fluid bearing so that said inflatable cushion is spaced from said plies and so that said plenum chamber is in superposed relation to said plies and said work surface to apply the pressure in said plenum chamber to said plies without physical contact between said inflatable cushion and said plies.

2. The method of claim 1 further comprising the step of: heating said plies while applying the pressure in said plenum chamber thereto.

3. The method of claim 2, wherein said step of heating comprises irradiating said plies with radiant energy.

4. The method of claim 2, wherein said step of heating comprises applying magnetic energy to said plies to inductively heat said plies.

5. The method of claim 2, further including the step of causing relative motion between the fluid bearing and the plies while heating and applying pressure to the plies.

6. A method for laying composite tape with a fluid bearing, said fluid bearing having an inflatable cushion that surrounds a cavity, said cavity cooperating with an opposing surface to form a pressurizeable plenum chamber when said inflatable cushion is inflated, said method comprising the steps of:
   disposing said fluid bearing opposite a work surface, inflating said inflatable cushion to form said plenum chamber, and pressurizing said plenum chamber with fluid;
   applying a load to said fluid bearing to develop a pressure in said plenum chamber;
   laying the tape on said work surface; and
   positioning said fluid bearing so that said inflatable cushion is spaced from said tape and so that said plenum chamber is in superposed relation to the tape laid on said work surface to apply the predetermined pressure in said plenum chamber to said tape so as to press said tape onto said work surface without physical contact between said inflatable cushion and said tape.

7. The method of claim 6, further including the step of:
   heating said tape while applying the predetermined pressure in said plenum chamber thereto.

8. The method of claim 7, wherein said step of heating comprises irradiating said tape with radiant energy.

9. The method of claim 8, wherein said step of hearing comprises applying magnetic energy to said tape to inductively heat said tape.

10. A method of laying composite tape with a fluid bearing, said fluid bearing having an inflatable cushion that surrounds a cavity, said cavity cooperating with an opposing surface to form a pressurizeable plenum chamber when said inflatable cushion is inflated, said method comprising the steps of:
    causing relative movement between a tape supply and a work surface to lay tape onto the work surface;
    disposing said fluid bearing opposite said work surface, inflating said inflatable cushion to form said plenum chamber, and pressurizing said plenum chamber with fluid;
    moving said pressurized plenum chamber over the tape laid on said work surface without physical contact between said inflatable cushion and said tape to press said tape onto said work surface.

11. The method of claim 10, further including the step of:

heating said tape while moving the pressurized plenum chamber thereover.

12. The method of claim 11, wherein said step of heating comprises irradiating said tape with radiant energy.

13. The method of claim 11, wherein said step of heating comprises applying magnetic energy to said tape to inductively heat said tape.

14. A method for consolidating composite materials with a fluid bearing, said fluid bearing having an inflatable cushion that surrounds a cavity, said cavity cooperating with an opposing surface to form a pressurizeable plenum chamber when said inflatable cushion is inflated, said method comprising the steps of:
positioning at least two plies of composite material on a work surface;
disposing said fluid bearing opposite said work surface, inflating said inflatable cushion to form said plenum chamber, and pressurizing said plenum chamber with fluid; and
moving said pressurized plenum chamber over the plies stacked on said work surface without physical contact between said inflatable cushion and said plies.

15. The method of claim 14, further including the step of:
heating said plies while moving the pressurized plenum chamber thereover.

16. The method of claim 15, wherein said step of heating comprises irradiating said plies with radiant energy.

17. The method of claim 15, wherein said step of heating comprises applying magnetic energy to said plies to inductively heat said plies.

18. A method for consolidating composite materials with a fluid bearing, said fluid bearing having an inflatable cushion that surrounds a cavity, said cavity cooperating with a surface that is spaced therefrom to form a pressurizeable plenum chamber when said inflatable cushion is inflated, said method comprising the steps of:
stacking at least two plies of composite material on a work surface;
disposing said fluid bearing in spaced relation to said work surface and inflating said inflatable cushion to form said pressurizeable plenum chamber;
pressurizing said plenum chamber with fluid;
applying a load to said fluid bearing to develop a pressure in said plenum chamber; and
positioning said fluid bearing so that said inflatable cushion is spaced from said plies and so that said plenum chamber is in superposed relation to said plies to apply the pressure in said plenum chamber to said plies without physical contact between said inflatable cushion and said plies.

* * * * *